Nov. 12, 1968

H. S. BOONE 3,410,578

TRAILER HITCH

Filed Nov. 4, 1966

Henry S. Boone
INVENTOR.

BY Clarence A. O'Brien
and Harvey B. Jacobson
Attorneys

Nov. 12, 1968
H. S. BOONE
3,410,578
TRAILER HITCH
Filed Nov. 4, 1966
2 Sheets-Sheet 2
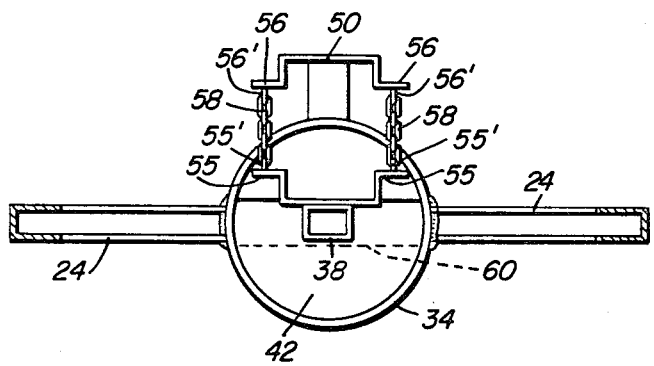
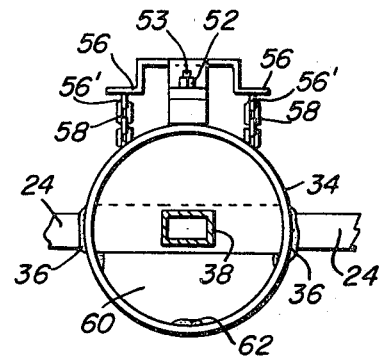
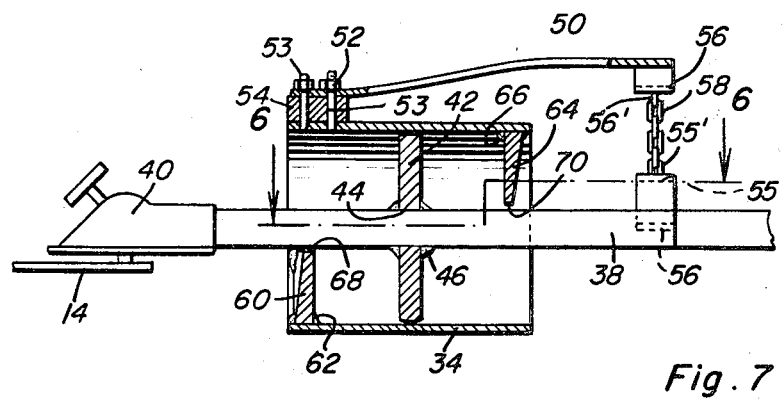
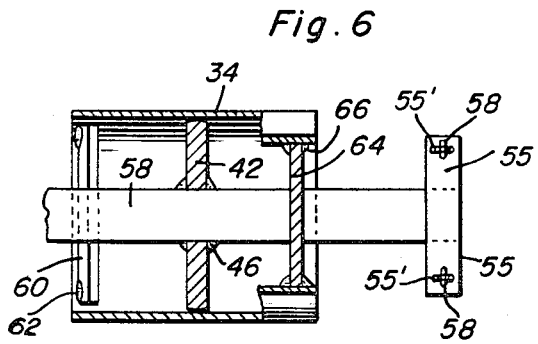
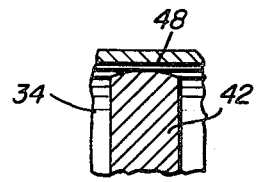
Henry S. Boone
INVENTOR.

United States Patent Office 3,410,578
Patented Nov. 12, 1968

3,410,578
TRAILER HITCH
Henry S. Boone, 2342 Midfield Drive,
Montgomery, Ala. 36111
Filed Nov. 4, 1966, Ser. No. 592,199
7 Claims. (Cl. 280—484)

ABSTRACT OF THE DISCLOSURE

A hitch construction for a trailer frame including a generally longitudinally extending horizontally disposed cylindrical member rigidly supported from the trailer frame and a tongue portion extending through the cylindrical member having an enlarged ball element defining portion thereon supported from the cylindrical member for limited reciprocation therein and limited universal oscillation relative thereto, and spring means connected between the tongue portion and the cylindrical member yieldingly urging the former to a generally centered position relative to the latter.

This invention relates to a novel and useful trailer tongue construction and more specifically to a suspension system for movably supporting at least the forward end portion of a trailer tongue from the trailer frame.

When trailering a trailer the towing vehicle is subjected to rearward pull on the towing hitch thereof when the towing vehicle is accelerating and forward thrusts on the trailer hitch thereof when the towing vehicle is decelerating. In addition, the towing vehicle is also sometimes subjected to intermittent rearward pulls and forward thrusts on the trailer hitch thereof while the towing vehicle and trailer are moving at a constant rate of speed. This intermittent application of forces on the trailer hitch of the towing vehicle is sometimes referred to as "surging."

Further, if the forward end of a trailer is too heavily loaded an excess amount of the weight of the trailer bears down upon the rear end of the towing vehicle and causes the rear end of the towing vehicle to be excessively overloaded. While this overloading condition may not be too severe when the towing vehicle and trailer are moving along smooth road surfaces, such partial overloading sometimes becomes severe if the towing vehicle and trailer are moving over rough road surfaces or road surfaces having dips therein which cause the forward end of the tongue of the trailer to bounce up and down. Finally, the rear end of a towing vehicle may also be subjected to alternate lateral thrusts by a trailer due to the trailer swaying or "fish-tailing" if the trailer tongue does not support a sufficiently large portion of the weight of the trailer or if the side area of the trailer is sufficient to cause the latter to sway when subjected to cross wind gusts.

Accordingly, it may be seen that the trailer hitch of a towing vehicle may have alternating forward and rearward thrusts as well as opposite side lateral thrusts and up-and-down thrusts applied thereto during a trailering operation. Inasmuch as any of these thrusts may have an adverse handling effect on the towing vehicle, the main object of this invention is to provide a trailer tongue construction including operating features which will cushion any and all of these thrusts whereby the full forces represented thereby will not be transmitted directly to the towing vehicle.

Another object of this invention, in accordance with the immediately preceding object, is to provide a trailer tongue construction which is readily adaptable to be secured to a trailer as a modification thereof or utilized in the initial construction of a trailer.

A final object of this invention is to provide a trailer tongue construction in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary transverse vertical sectional view taken substantially upon the plane indicated by the section line 3—3 of FIGURE 1;

FIGURE 4 is a fragmentary enlarged transverse vertical sectional view then substantially upon the plane indicated by the section line 4—4 of FIGURE 1;

FIGURE 5 is an enlarged fragmentary longitudinal vertical sectional view taken substantially upon the plane indicated by the section line 5—5 of FIGURE 1;

FIGURE 6 is a fragmentary horizontal sectional view taken substantially upon the plane indicated by the section line 6—6 of FIGURE 5; and FIGURE 7 is an enlarged fragmentary longitudinal vertical sectional view taken substantially upon the plane indicated by the section line 7—7 of FIGURE 3.

Figure 1:
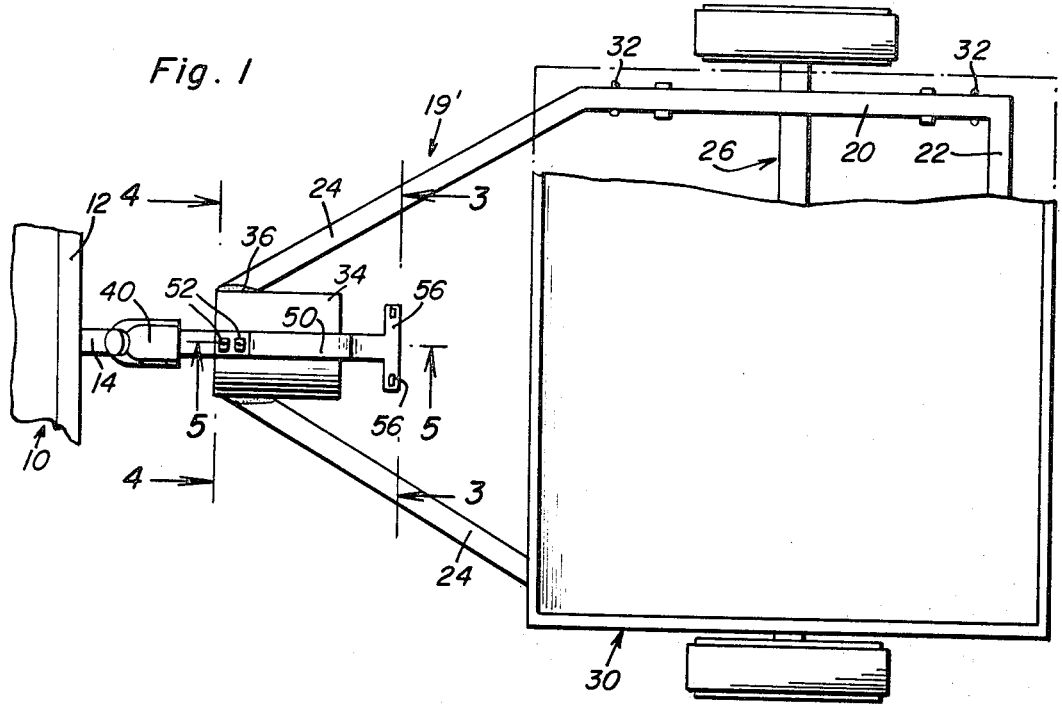
FIGURE 1 is a top plan view of a trailer constructed in according with the present invention and illustrated as swivelly connected to a trailer hitch of a towing vehicle and with portions of the load body of the trailer broken away.
Figure 2:
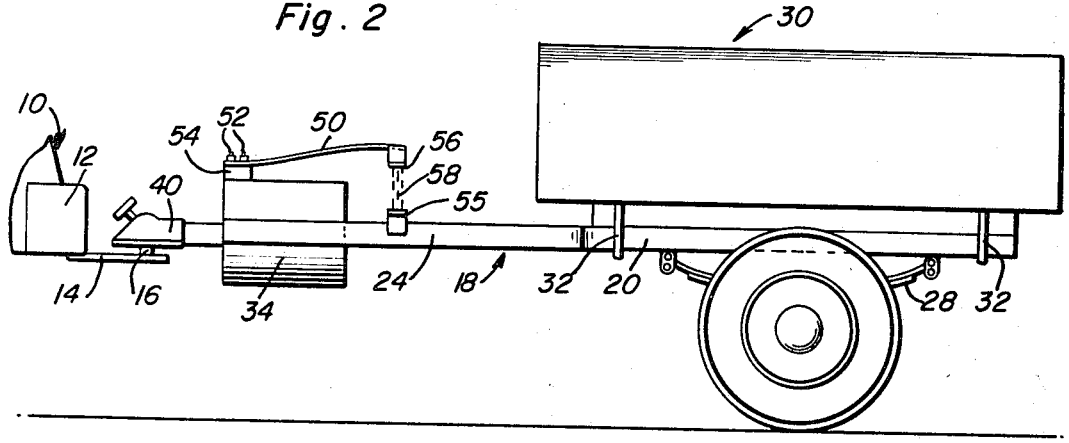
FIGURE 2 is a fragmentary side elevational view of the assemblage illustrated in FIGURE 1.

Referring now more specifically to the drawings the numeral 10 generally designates a towing vehicle which includes a bumper 12 having a trailer hitch 14 supported therefrom. The trailer hitch 14 includes the usual ball hitch element 16 and may of course be of any desired size.

A two-wheeled trailer is generally referred to by the reference numeral 18 and includes a main frame referred to in general by the reference numeral 19. The frame 19 includes a pair of opposite side longitudinal members 20 interconnected at their rear ends by means of a rear transverse member 22 and including forwardly convergent arm portions 24 at their forward ends. An axle assembly generally referred to by the reference numeral 26 is provided and is secured to the frame 19 in a conventional manner by means of opposite side leaf spring assemblies 28. Further, a load box assembly generally referred to by the reference numeral 30 is secured to the frame 19 by means of suitable fastening means 32 of conventional design.

The forwardly convergent arm portions 24 have a generally horizontally disposed and longitudinally extending cylinder member 34 secured therebetween in any convenient manner such as by welding 36. An elongated arm member or tongue portion 38 is provided and extends longitudinally of the trailer 18. The forward end of the tongue portion 38 includes a conventional ball socket assembly 40 in which the ball portion of the element 16 is captively and swivelly disposed. The tongue portion 38 extends through the cylinder member 34 and has a circular disk member 42 secured thereto. The tongue portion 38 may be of any suitable cross-sectional shape such as rectangular, see FIGURES 3 and 4, and the disk member is provided with a centrally disposed opening 44 of complementary cross-sectional shape through which the tongue portion 38 is snugly received, the disk member 42 being fixedly secured to the tongue portion 38 in any convenient manner such as by welding 46.

The diameter of the disk member 42 is only slightly less than the inside diameter of the cylinder member 34 and the peripheral edge portions of the disk member 42 are curved as at 48 so as to define segments of a sphere having its center located at the intersection of the longitudinal centerline of the tongue portion 38 and the medial plane of the disk member 42. Accordingly, it may be seen that the disk member 42 acts as a diametrically enlarged ball element portion and therefore that the ball socket assembly 40 is universally supported from the cylinder member 34 for movement in all directions in a transverse vertical plane passing through the ball socket assembly 40. Of course, since the disk member 42 is also slidably received within the cylinder member 34, the ball socket assembly 40 may also be reciprocated longitudinally of the cylinder member 34.

An elongated spring arm 50 is provided and has one end secured to the forward end of the cylinder member 34 by means of a plurality of suitable fasteners 52 threaded on studs 53 carried by the upper wall portion of the forward end of the cylinder member 34 and passing through a spacer block 54 and the spring arm 50. The rear end of the arm 50 is slightly upwardly offset and thus spaced appreciably above the rear end of the tongue portion 38 which includes a pair of opposite side outwardly and upwardly offset anchoring flanges 55 to which anchoring eyes 55' are secured by any convenient means. The free end of the arm 50 includes a pair of similar outwardly and downwardly offset anchoring flanges 56 to which anchoring eyes 56' are secured and a pair of articulated and elongated tension members 58 are secured between each pair of eyes 55' and 56', the effective length of the members 58 being no more than the spacing between the plates 60 and 64 and the disc member 42. Further, the lower forward portion of the end of the cylinder member 34 has a generally semicircular abutment plate 60 secured therein in any convenient manner such as by welding 62 and the upper portion of the rear end of the cylinder member 34 has a similar generally semi-circular abutment plate 64 secured therein in any convenient manner such as by welding 66. The upper edge portion 68 of the abutment plate 60 is generally horizontally disposed and spaced slightly beneath the adjacent portion of the tongue portion 38 when the latter extends substantially axially of the cylinder member 34. In addition, the lower edge portion 70 of the abutment plate 64 is also generally horizontally disposed and is spaced slightly above the adjacent portion of the tongue portion 38 when the latter extends axially of the cylinder member 34. Accordingly, it may be seen that the tongue portion 38 is allowed to be angularly shifted about a horizontal transverse axis disposed in the plane of the disk member 42 only slightly in a counterclockwise direction from the axially extending position illustrated in FIGURE 5 of the drawings. Of course, the spring arm 50, as the tongue construction is illustrated in FIGURE 5 of the drawings, is flexed to the extent that it is exerting an upward pull on the rear end of the tongue portion 38 equivalent to approximately one seventh of the total weight of the trailer 18. Of course, the ball socket assembly 40 is illustrated in FIGURE 5 of the drawings as being operatively connected to the trailer hitch 14 and therefore it is to be appreciated that as soon as the ball socket assembly 40 is lifted out of engagement with the trailer hitch 14 the spring 50 will swing the rear end of the tongue portion 38 upwardly so as to slightly angularly displace the tongue portion 38 into contact with either one or both of the surfaces 68 and 70.

The surfaces 68 and 70 of course prevent the forward end of the tongue portion 38 from dropping excessively downwardly relative to the cylinder member 34 while the spring arm 50 yieldingly resists upward movement of the forward end of the tongue portion 38 relative to the cylinder member 34. Further, inasmuch as the rear end of the spring arm 50 is centered above the rear end of the tongue portion 38 when the latter extends axially of the cylinder member 34, any slight horizontal lateral movement of the ball socket assembly 40 relative to the cylinder member 34 while the tongue portion 38 is substantially horizontally disposed will cause additional flexing of the spring arm 50. Further, any tendency of the tongue portion 38 to shift axially from the position thereof illustrated in FIGURE 5 of the drawings will also cause the spring arm 50 to be further flexed. Therefore, it may be seen that the single spring arm 50 yieldingly urges the tongue portion 38 toward a position intermediate the limits of longitudinal reciprocation of the tongue portion 38 defined by the plates 60 and 64, urges the ball socket assembly 40 toward a position between the limits of horizontal lateral oscillation of the socket assembly 40 relative to the cylinder member 34 and also yieldingly urges the tongue portion 38 toward its limit position of oscillation about a horizontal transverse axis disposed in the plane of the disk member 42 in a counterclockwise direction. Therefore, it may be seen that a single spring arm 50 is operative to partially absorb and therefore in part cushion front and rear thrusts, horizontal lateral thrusts and downward thrusts applied to the trailer hitch 14 by the trailer 18.

With attention now invited more specifically to FIGURES 3 and 5 of the drawings, it will be appreciated that since the effective length of the tension members 58 is less than the distance between the plates 60 and 64 and the disc member 42 even though the free end of the spring arm 50 might be downwardly displaced sufficiently to horizontally register the eyes 56' with the eyes 55' the disc member 42 will not be permitted to shift longitudinally of the cylinder member 34 from its centralized position illustrated in FIGURE 5 to contact either the plate 60 or the plate 64. In addition, the limited effective length of the tension members 58 will also prevent any portion of the tongue portion 38 from contacting the end edge portions of the cylinder member 34. Further, the ball socket assembly 40 is positioned on the tongue portion 38 a distance spaced sufficiently forward of the disc member 42 to prevent the assembly 40 from contacting the forward end of the cylinder member 34. Further, the tension members 58, although specifically illustrated as lengths of chain could readily be any suitable form of tension members such as cables or rod-like members having their opposite end portions swivelly supported from the anchor points defined by the eyes 55' and 56'. Further, the yieldably supported eyes 56' could be supported from any suitable member in lieu of the spring arm 50 as long as the replacement support member for the eyes 56' is yieldably urged toward a centered position of movement in an upstanding plane extending transversely of the tongue portion 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a first support member and a second member to be suspended therefrom, a suspension system, said suspension system comprising means supporting said second member from said first member for reciprocal movement along a predetermined path and for limited oscillation in generally right angularly disposed planes generally paralleling said path, said second member being carrier by an elongated arm member generally paralleling said path, said means supporting said second member from said first member including means defining a universal connection between said first member and a point on said arm member spaced longitudinally thereof from said second member, said universal connection being defined by a ball and socket-type of connection between said arm member and said second member, said ball and socket-type of connection including a diametrically enlarged ball element defining portion comprising said second member on said arm member, said first member including surface means defining a cylinder through which said arm members extends snugly and universally receiving said ball element defining portion therein, said ball element defining portion also being received in said cylinder for reciprocal movement longitudinally thereof.

2. The combination of claim 1 including elongated spring arm means carried by one of said members, said spring arm means being anchored securely to said one member at a first longitudinal location along said spring arms means, and elongated and articulated tension member means connected at one end to the other of said members and at the other end to a second longitudinal location along said spring arm means, said spring arm means and said tension member means serving to urge said second member toward positions intermediate the limit positions of reciprocal movement along said path and intermediate the limit positions of oscillation in one of said planes and also to urge said second member toward one limit position of oscillation in the other of said planes.

3. A trailer frame including a forwardly projecting tongue portion, a first support member supported from said frame, a second member supported from said tongue portion, a suspension system, said suspension system comprising means supporting said second member from said first member for reciprocal movement along a predetermined path and for limited oscillation in generally right angularly disposed planes generally paralleling said path, spring means operatively connected between said first and second members urging said second member toward positions intermediate the limit positions of reciprocal movement along said path and intermediate the limit positions of oscillation in one of said planes and also toward one limit position of oscillation in the other of said planes, said second member being carried by an elongated arm member generally parallelling said path, said means supporting said second member from said first member including means defining a universal connection between said first member and a point on said arm member spaced longitudinally thereof from said second member, said elongated arm member comprising said tongue portion, said elongated tongue portion including a diametrically enlarged ball element defining portion defining said second member, said first member including surface means defining a cylinder snugly and universally receiving said ball element defining portion therein, said ball element defining portion also being received in said cylinder for reciprocal movement longitudinally thereof.

4. The combination of claim 3 wherein said second member includes a ball socket assembly disposed forwardly of said ball element defining portion and adapted to be connected to a ball element supported from a towing vehicle.

5. The combination of claim 4 wherein said spring means comprises a spring member anchored to said frame and including a portion spaced vertically relative to said tongue portion and yieldingly movable in all directions in a generally vertical plane extending transversely of said tongue portion, and articulated elongated tension member means connected to said spring means portion at one end and to said tongue portion at the other end at a point spaced longitudinally of said tongue portion from said ball element defining portion thereof.

6. A trailer frame including a forwardly projecting elongated tongue portion, a first support member being supported from said frame, a second member supported from said tongue portion, a suspension system, said suspension system comprising means supporting said second member from said first member for reciprocal movement along a predetermined path and for limited oscillation in generally right angularly disposed planes generally paralleling said path, said first member including surface means defining a generally horizontally disposed cylinder extending longitudinally of said frame, said second member comprising a diametrically enlarged ball element portion on a rear end portion of said tongue portion, said ball element portion being snugly, universally and longitudinally slidably received in said cylinder, and spring means connected between said frame and said tongue portion at a point spaced longitudinally along the latter from said ball element portion yieldingly resisting upward and horizontal lateral movement of the forward end of said tongue portion relative to said cylinder and yieldingly resisting longitudinal shifting of said tongue portion relative to said cylinder independent of angular displacement of said tongue portion relative to said cylinder.

7. The combination of claim 6 wherein said spring means comprises a spring member anchored to said frame and including a portion spaced vertically relative to said tongue portion and yieldingly movable in all directions in a generally vertical plane extending transversely of said tongue portion, and articulated elongated tension member means connected to said spring means portion at one end and to said tongue portion at the other end at a point spaced longitudinally of said tongue portion from said ball element defining portion thereof.

References Cited

UNITED STATES PATENTS 1,288,432   12/1918   Long _____ 280—484 X

FOREIGN PATENTS 730,448   5/1932   France.
140,369   11/1920   Great Britain.
538,166   7/1941   Great Britain.

LEO FRIAGLIA, *Primary Examiner.*